2,980,706

EPOXY ESTERS AND PREPARATION THEREOF

George B. Payne, Berkeley, Calif., assignor to Shell Oil Company, a corporation of Delaware No Drawing. Filed Mar. 3, 1958, Ser. No. 718,440

6 Claims. (Cl. 260—348)

This invention relates to novel 3,3-dialkyl-2-acyloxyoxirane compounds, the preparation thereof, and to the method of making these compounds by reacting an α,β-unsaturated ketone having two alkyl groups in the β position with an organic peracid. The present invention is particularly concerned with the preparation of 3,3-dimethyl-2-acetoxyoxirane by reacting mesityl oxide with peracetic acid.

In the past α,β-unsaturated ketones having a phenyl group in the β position have been reacted with peracids to form enol esters. It has now been discovered, however, that the reaction of an α,β-unsaturated ketone having two alkyl groups in the β position with an organic peracid, such as peracetic acid, does not form an enol ester. Rather, it has been found that a 3,3-dialkyl-2-acyloxyoxirane is produced in high yield. It is believed that the high yield of the oxirane compound may be due to the presence of the two alkyl groups in the β position on the α,β-unsaturated ketone.

The α,β-unsaturated ketones having two alkyl groups in the β position, which may be employed for the purposes of the present invention, may be represented by the following formula:

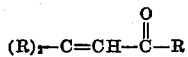

wherein R represents an alkyl radical preferably containing from 1 to 5 carbon atoms. Specific examples of unsaturated ketones contemplated by the present invention are 4-methyl-3-penten-2-one (mesityl oxide), 8-ethyl-7-decen-6-one, 5-pentyl-4-decen-3-one, and 6-methyl-5-nonen-4-one. Of these, 4-methyl-3-penten-2-one (mesityl oxide) is preferred.

The organic peracids which may be employed for the purposes of the present invention may be represented by the following structural formula:

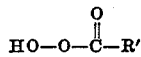

wherein R' represents an alkyl radical preferably containing from 1 to 10 carbon atoms. Specific examples of organic peracids contemplated by the present invention are peracetic acid, perpropionic acid, perbutyric acid, and perhendecanoic acid. Of these, peracetic acid is preferred.

The novel 3,3-dialkyl-2-alkylcarboxyoxirane compounds of the present invention may be represented by the following structural formula

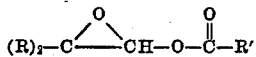

wherein each R represents an alkyl radical preferably containing from 1 to 5 carbon atoms and R' represents an alkyl radical preferably containing from 1 to 10 carbon atoms. Specific examples of these novel oxirane compounds include 3,3-dimethyl-2-acetoxyoxirane, 3,3-dipropyl-2-butoxyoxirane, 3,3-dipentyl-2-decoxyoxirane and 3-methyl-3-pentyl-2-acetoxyoxirane.

A specific example of a reaction of an α,β-unsaturated ketone having two alkyl groups in the β position with an organic peracid follows. It is to be understood, however, that the present invention is not limited to the examples set forth but encompasses broadly the preparation of 3,3-dialkyl-2-acyloxyoxirane compounds by reacting α,β-unsaturated ketones having two alkyl groups in the β position with an organic peracid.

To a stirred solution of 49 grams (0.50 mole) of mesityl oxide ($n_D^{20}$ 1.4401) in 250 ml. of chloroform was added 0.50 mole of 45% peroxyacetic acid (previously treated with sodium acetate to neutralize the sulfuric acid present). The mixture was stirred at 20–25° (using a water bath held at 15–20°) by periodic addition of ice, and the rate of disappearance of peroxyacetic acid was followed iodometrically.

| Δ Time (hrs.): | Percent peroxyacetic acid consumed |
|---|---|
| 1 | 53 |
| 2.5 | 89 |
| 3.5 | 93 |
| 4.5 | 96 |

The mixture was treated with 150 ml. of water followed by the portionwise addition of 125 grams of sodium bicarbonate. When carbon dioxide was no longer evolved, excess solid was removed by filtration and the organic layer was washed with 100 ml. of half-saturated ammonium sulfate solution. After drying over magnesium sulfate, the bulk of the chloroform was removed at atmospheric pressure using a 10-tray Oldershaw column. When the kettle temperature reached 120°, distillation was continued under vacuum through a 0.5 x 60 cm. glass spiral-packed column. The following fractions were obtained:

Fraction 1: 54–70° (100 mm.), 1.8 g.
Fraction 2: 70–72° (100 mm.), 20.7 g., $n_D^{20}$ 1.4402.
Fraction 3: 72–82° (100–50 mm.), 3.8 g.
Fraction 4: 82–83° (50 mm.), 17.3 g.; residue, 3 g.

Fraction 2 was recovered mesityl oxide (0.21 mole); its refractive index indicated the absence of any enol ester. Analysis of fraction 4 indicated it to be a mixture composed of 78% weight 3,3-dimethyl-2-acetoxyoxirane and 22% weight 4-mecityl-3,4-epoxy-2-pentanone:

Analysis.—Calcd. for 78% $C_6H_{10}O_3$: C, 57.1; H, 8.0. Found: C, 57.1; H, 8.0.

The infrared spectrum showed ester carbonyl absorption at 5:73μ with a shoulder at 5:84μ. A sample of 4-methyl-3,4-epoxy-2-pentanone exhibited carbonyl absorption at 5:84μ.

Fraction 4 (15 g.) was washed with three 25-ml. portions of water, dried over magnesium sulfate and Claisen distilled to give 7 g. of 3,3-dimethyl-2-acetoxyoxirane, B.P. 60° (20 mm.), $n_D^{20}$ 1.4128, which, by analysis, was substantially free of the ketone epoxide.

Analysis.—Calcd. for $C_6H_{10}O_3$: C, 55.4; H, 7.7. Found: C, 55.8; H, 7.9.

In another example of a preparation encompassed by the present invention 550 grams (2.2 moles) of peracetic acid was added to a solution of 98 grams (1.0 mole) of redistilled mesityl oxide in 1000 ml. of chloroform. The reaction mixture was stored in an ice bath for three days and the crude product distilled through a two-foot packed column. Thirty-one percent 3,3-dimethyl-2-acetoxyoxirane was obtained.

Generally speaking, the temperature of the reaction may vary considerably without departing from the scope of the invention. Room temperatures are generally preferred, however, because of the instability of peracids at elevated temperatures. The mole ratio of ketone to peracid may vary considerably. As a practical matter, a mole ratio range of 1:10 to 10:1 of ketone to peracid is generally employed. The reactions are usually carried out by dissolving the olefin in an inert solvent, preferably chloroform, and adding the organic peracid. It will be understood, however, that the invention is not limited to chloroform. Thus, other inert solvents such as methylene chloride, carbon tetrachloride, benzene, ethyl acetate and acetone may be employed.

When the reaction is exothermic, the peracid addition may be made dropwise with stirring at a low temperature (usually 0–10° C.). When the reaction is not exothermic, the addition of peracid may be made in one portion, and the reaction mixture allowed to stand at room temperature. Isolation of the products may be accomplished by removal of any excess peracid from the reaction mixture followed by distillation. If the products are water-insoluble, virtually all the acid may be removed by two water washes followed by a dilute carbonate wash. When the product exhibits water solubility, the acid may be removed by an alkali wash.

The epoxy esters of the present invention are particularly useful as precursors for epoxy resins and stabilizers and plasticizers for polyvinyl chlorides. They may also be polymerized and used as oil additives. They are also reactive diluents for epoxy resins. In order to polymerize the esters of the present invention, 0.1% to about 5% by weight of an amine curing agent will generally be sufficient.

I claim as my invention:

1. The process for the preparation of an epoxyester

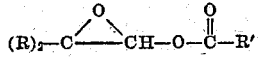

comprising commingling at a temperature of from about 0° C. to room temperature and thereby effecting reaction between, a ketone represented by the formula

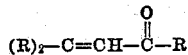

wherein each R is an alkyl group of from one to five carbon atoms, and an organic peracid represented by the formula

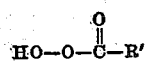

wherein R' is an alkyl group of from one to ten carbon atoms.

2. The process for the preparation of 3,3-dimethyl-2-acetoxyoxirane comprising commingling at a temperature of from about 0° C. to room temperature and thereby effecting reaction between mesityl oxide and peracetic acid.

3. An oxirane compound represented by the formula

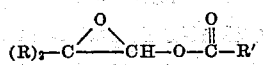

wherein each of R represents an alkyl group of from 1 to 5 carbon atoms, and R' represents an alkyl group of from 1 to 10 carbon atoms.

4. 3,3-dimethyl-2-acetoxyoxirane.

5. The process in accordance with claim 1 wherein the acid is peracetic acid.

6. The process in accordance with claim 2 wherein the reaction is carried out using an initial mole ratio of mesityl oxide to peracetic acid of about 1:10 to about 10:1 and at a temperature below that at which the acid is unstable.

References Cited in the file of this patent

UNITED STATES PATENTS

| | | |
|---|---|---|
| 2,252,039 | Schirm | Aug. 12, 1941 |
| 2,448,602 | Kester et al. | Sept. 7, 1948 |
| 2,567,842 | Erickson | Sept. 11, 1951 |
| 2,758,119 | Bell | Aug. 7, 1956 |
| 2,765,284 | Bersworth | Oct. 2, 1956 |
| 2,765,296 | Strain | Oct. 2, 1956 |
| 2,768,182 | Burk | Oct. 23, 1956 |

FOREIGN PATENTS

| | | |
|---|---|---|
| 518,057 | Great Britain | Feb. 15, 1940 |

OTHER REFERENCES

Criegee: Methoden der Organisch. Chemie, vol. III, pp. 68–70.

Swern: Chem. Reviews, vol. 45, pp. 1–6, 16, 19, 22 and 41 (1949).